M. MOSKOWITZ.
MOTOR VEHICLE.
APPLICATION FILED DEC. 18, 1912.
1,069,279.
Patented Aug. 5, 1913.
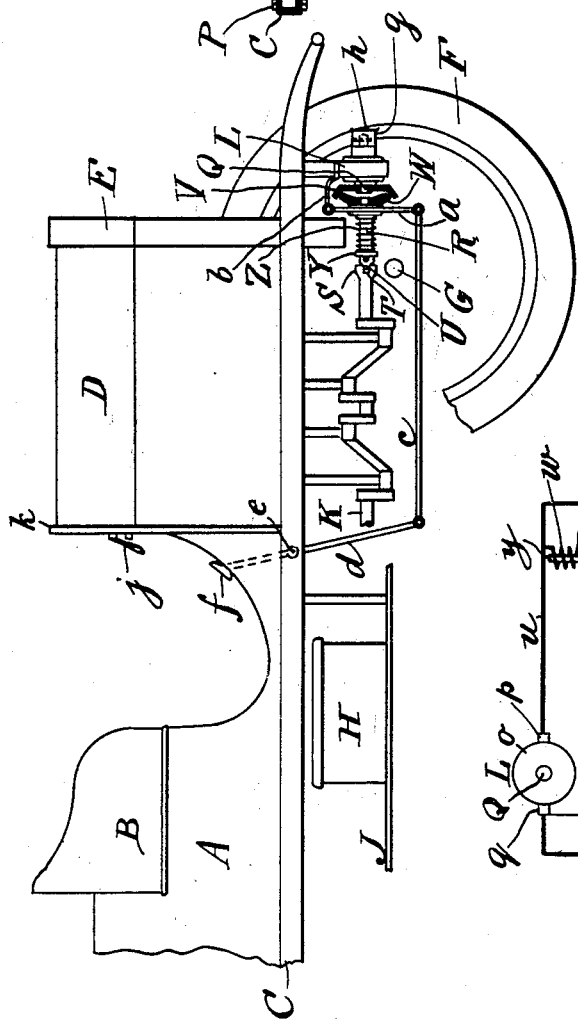

UNITED STATES PATENT OFFICE.

MORRIS MOSKOWITZ, OF MONTCLAIR, NEW JERSEY.

MOTOR-VEHICLE.

1,069,279.      Specification of Letters Patent.      Patented Aug. 5, 1913.

Continuation in part of application Serial No. 700,429, filed May 29, 1912. This application filed December 18, 1912. Serial No. 737,484.

*To all whom it may concern:*

Be it known that I, MORRIS MOSKOWITZ, a citizen of the United States, and a resident of Montclair, New Jersey, have invented certain new and useful Improvements in Motor-Vehicles, of which the following is a specification, accompanied by drawings.

This application is a division of my copending application Serial No. 700,429, filed May 29, 1912, with additional features.

This invention relates generally to starting apparatus and lighting apparatus for motor vehicles having an engine, as a gas engine, requiring an initial starting impulse to be applied to the crank shaft, and the best form of the invention known to me is embodied in combined power driven electric apparatus for first starting the engine and thereafter furnishing current for lighting, ignition, and any other desired purposes.

My invention does away with hand cranking by providing power driven means for cranking the engine, preferably electrically operated, which are efficient and economical and capable of also furnishing current when acting as a generator.

Heretofore automatic starting devices have been connected to various parts of automobile gas engines and crowded under the engine hood where there is inadequate room, the power transmission being effected through chains, gears or belting, but in addition to the lack of space under the hood, the parts are not easily reached for inspection and repairs, and the construction is impractical and costly from an engineering standpoint; particularly is this true in connection with electric starting and lighting apparatus, in which a dynamo electric machine is employed operatively connected to the engine crank shaft. A comparatively small machine will generate sufficient current for lighting an automobile, but such a machine is entirely inadequate for starting a gas engine, because considerable power is required to start the average automobile gas engine, especially when cold. In the apparatus heretofore used, the dynamo electric machine has been very large and heavy, and is run at high speed when acting as a motor, while the gas engine crank shaft is turned over slowly through gear reduction or other means. These large machines are cumbersome, too heavy for commercial use, and not well adapted for automobile use, especially in the cramped quarters in which they have been placed.

One of the primary objects of my invention is to enable the engine to be started by means of a small and light dynamo electric machine of low power as compared with the large high powered machines heretofore used. In fact, I have discovered means for starting the engine with the power furnished by a machine no larger than that required for ordinary lighting purposes and incapable of cranking the engine if directly connected thereto. Instead of a large number of storage battery cells to furnish the starting current, I ordinarily require no more cells than ordinarily used for lighting and ignition purposes. I thus economize on the consumption of current and reduce the necessary weight of the battery, as well as reducing the necessary weight of the dynamo electric machine.

In order to adapt a small dynamo electric machine to the heavy duty of starting a gas engine, I bring the machine, running as a motor without load, up to speed while disconnected from the engine crank shaft, and I provide means, as for instance, a friction clutch for gradually applying the power of the motor to the engine crank shaft, thus causing the machine to crank the gas engine shaft in a natural manner, due to the gradually developed torque of the motor. Less current is drawn from the battery than if the dynamo electric machine was started under load and ideal conditions are established for the use of a small light battery in an automobile.

Another important consideration which develops as a result of the reduction in the size, weight and power of the dynamo electric machine, resides in the fact that I am not limited to the confined space under the engine hood for mounting my apparatus on the vehicle, since I may mount the dynamo electric machine at the front of the vehicle, preferably outside of the radiator. The machine may readily be connected to any suitable part of the car frame at the front of the radiator, and the armature shaft may conveniently be arranged in substantial prolongation of the engine crank shaft, with suitable clutch operating means or other devices operated from the driver's seat for gradually connecting one shaft to the other.

The dynamo electric machine occupies small space at the front of the vehicle, adds no appreciable weight to the vehicle, and is readily inspected and repaired, without the necessity of dismantling a portion of the car. Another great advantage of mounting the dynamo electric machine at the front of the car, outside of the hood, resides in the fact that, other things being equal, I can use a smaller machine than would be possible under the hood or in any other location on the car, and I avoid the serious disadvantage of subjecting the machine to the intense heat of the engine under the hood. Since the capacity of a dynamo electric machine is limited by its ability to withstand heat, I am enabled to obtain maximum capacity with a minimum weight and size. After the machine has been utilized as a motor to start the engine, the armature remains connected to the engine crank shaft and the machine is driven as a generator for furnishing current.

I am not to be understood as limiting the invention to a particular dynamo electric machine, or a particular clutch.

The invention is illustrated in one of its preferred forms in the accompanying drawings, in which—

Figure 1 is a diagrammatic side elevation, partly broken away, of so much of a motor vehicle as will serve to illustrate the invention; Fig. 2 is a front end elevation of Fig. 1; Fig. 3 is a diagrammatic view of suitable circuits and connections for the starting and lighting apparatus; Fig. 4 is a diagrammatic side elevation similar to Fig. 1, showing a modification of the invention, and Fig. 5 is a transverse sectional view of Fig. 4 on the line 5—5 looking in the direction of the arrows.

Referring to the drawings, A represents a portion of the body of the motor vehicle, B the driver's seat, C the side frames or reaches, preferably in the form of channels, D the engine hood, and E the radiator at the front of the car. One of the front wheels is indicated diagrammatically at F, and G indicates the position of the front axle. The storage battery cells H are conveniently mounted on the running board J as usual and the crank shaft is indicated at K with the parts of the car, which would otherwise hide the crank shaft from view, removed for simplicity and clearness of illustration.

A light and small dynamo electric machine L is suitably mounted at the front of the vehicle outside of the radiator E and suspended from any suitable part of the car, as by means of the brackets or arms O which may be conveniently connected to the channels C as by means of the bolts P. The armature shaft Q is preferably separate and independent from the crank shaft K and may be conveniently arranged substantially in alinement or prolongation of the crank shaft. A short coupling piece R forming a portion of the crank shaft is preferably provided coupled to the main shaft K as by means of an Oldham coupling S, comprising in this instance a female member or socket T on the main shaft K and a male member U on the coupling member R, affording a certain amount of play between the parts. Any other suitable coupling may be provided at this point.

Suitable means are provided for gradually applying the power of the dynamo electric machine to the crank shaft, in this instance a clutch being shown comprising the female clutch member V connected to the armature shaft Q and the male clutch member W connected to rotate with the coupling member R, but slidable thereon. In order to actuate the clutch member W longitudinally, the hub of said member may be provided with the circumferentially grooved portion X between which and a stop or collar Y on the coupling member R is provided a compression spring Z normally tending to force the clutch member W against the clutch member V. Any suitable means may be provided for operating the clutch member W from the driver's seat, one suitable device being shown comprising a rod $a$ pivoted to a bracket $b$ and suitably engaging the grooved portion X of the hub of the clutch member W, so that the hub may rotate relatively to the rod $a$. A longitudinal connecting rod $c$ connects the rod $a$ with a foot lever $d$ pivoted at $e$ to the frame of the car and having its end $f$ in convenient position for manipulation by the foot of the driver, so that by pressing upon the operating end $f$ of the lever $d$, the clutch member W will be retracted from the clutch member V.

A cap $g$ may be provided at the outer end of the armature shaft Q into which the end $h$ of the armature shaft extends, so that a hand crank may be used for turning the engine over slowly by hand, as for instance, for timing purposes.

In cranking the engine by means of my improved apparatus, a starting switch $j$ may be conveniently provided on the dash-board $k$ and suitable circuits and connections are provided for supplying current from the battery H to the dynamo electric machine L for operating the machine as a motor. The driver first disconnects the clutch members V and W by means of the foot lever $f$ and then throws the switch $j$ and brings the dynamo electric machine up to speed as a motor disconnected from the crank shaft of the engine and without load. After the machine has been speeded up as a motor, pressure on the foot lever is gradually relaxed and the clutch members V and W are allowed to gradually engage, thereby permitting the dynamo electric machine operating as a motor to crank the engine. The dynamo electric machine which would otherwise have inadequate power for starting the engine if directly connected to the crank shaft, is enabled to do the required work of turning over the engine as the power is gradually applied to the crank shaft. The circuits and connections are such and the dynamo electric machine is of such character, that after the engine is started, the clutch members V and W may remain in engagement and the machine will be operated as a generator furnishing current for useful purposes.

In Fig. 3 a diagrammatic view is shown of suitable circuits and connections, in which $o$ represents the armature of the dynamo electric machine L having the brushes $p$ and $q$. $j$ represents the starting switch adapted to be placed on the dash-board as stated and H represents the storage battery cells. A lighting circuit $r$ having the lamps $s$ or other translating devices, is provided with the switch $t$ and connected to the battery terminals. The main armature circuit $u$ indicated in heavy lines is connected to charge the battery H and the switch $j$ is interposed in this main circuit. An automatic switch $v$ comprises the coils $w$ and $x$ connected across the armature and adapted to actuate the core $y$ having the switch member $z$ coöperating with the contacts 2 and 3 connected respectively to the main circuit $u$ and to the circuit of the coils $w$ and $x$, so that when the switch member $z$ bridges the contacts 2 and 3, the armature circuit will be closed through this switch. It is to be understood that any suitable switch may be used and the dynamo electric machine L may be of any approved self-regulating type of dynamo under speed variations.

In the operation of the apparatus, by closing the manual switch $j$, current passes from the battery H to the dynamo electric machine L and said machine rotates as a motor. Working as a generator, the dynamo electric machine L will cause the automatic switch $v$ to close when the voltage is high enough to overcome or charge the battery H and this automatic switch $v$ will also open the circuit between the battery H and the generator L when the voltage falls below a predetermined point. I have merely illustrated suitable circuits and connections for carrying out the operation of the apparatus, but obviously different arrangements may be used.

It will be seen that the objects of the invention, as stated in the opening paragraphs of this specification, are carried out by means of the apparatus illustrated in the drawings, but obviously different mechanical constructions and arrangements of parts may be devised without departing from the spirit of the invention.

In some instances, it may be desirable to provide automatic means for gradually connecting the dynamo electric machine to the engine shaft, and in Figs. 4 and 5, I have shown such a modification. Any suitable form of automatic clutch may be interposed between the dynamo electric machine and the engine shaft, for instance, the armature shaft Q may be provided with a disk 5 carrying centrifugal clutch members 6 adapted to coöperate with the female clutch member 7 on the main crank shaft 8. The centrifugal clutch members 6 are shown in the form of arms pivoted at 9 to the disk 5, and normally retracted by springs 10. The outer ends of the members 6 are provided with shoes 12 having friction surfaces adapted to frictionally engage the female member 7, when the members 6 are thrown outwardly by centrifugal force, and thus gradually connect the dynamo electric machine to the engine shaft.

The motor L may, if desired, be of sufficient size and strength and have sufficient starting torque to be capable of starting the engine directly without first speeding up the motor. In that case the clutch would be engaged directly without substantial slip on starting. The increased weight of this motor generator can be compensated for by reducing the weight of the gas engine flywheel by an amount substantially equivalent to the weight of the armature of the motor generator.

I claim and desire to obtain by Letters Patent the following:

1. The combination with the frame of an automobile, of an internal combustion engine mounted at the front of said frame, the shaft of said engine having a forward extension, a clutch-member on said extension, a dynamo machine hung on brackets below said frame and in front of the engine hood, the armature shaft of said dynamo machine having thereon a clutch-member to coöperate with the clutch-member on the engine shaft extension, a storage battery and connections therefrom to the dynamo, and means operated from the driver's seat for mechanically controlling the clutch and means similarly located for electrically controlling the dynamo.

2. The combination with the frame of an automobile, of an internal combustion engine mounted at the front of said frame, the shaft of said engine having a forward extension, said extension having a swiveled coupling to said engine shaft, a clutch-member on said extension, a dynamo machine hung on brackets below said frame and in front of the engine hood, the armature shaft of said dynamo machine having thereon a clutch-member to coöperate with the clutch-member on the engine shaft extension, a storage battery and connections therefrom to the dynamo, and means operated from the driver's seat for mechanically controlling the clutch and means similarly located for electrically controlling the dynamo.

3. The combination with the frame of an automobile, of an internal combustion engine mounted at the front of said frame, the shaft of said engine having a forward extension, a clutch-member on said extension, a dynamo machine hung on brackets below said frame and in front of the engine hood, the armature shaft of said dynamo machine having thereon a clutch-member to coöperate with the clutch-member on the engine shaft extension, and a storage battery and connections therefrom to the dynamo, and means for electrically controlling the dynamo.

In testimony whereof I have signed this specification in the presence of two subscribing witnesses.

MORRIS MOSKOWITZ.

Witnesses:
HERBERT G. OGDEN,
HENRY SHELDON.